March 17, 1942.   A. J. WADE   2,276,810

ELECTRIC VALVE CONTROL SYSTEM

Filed Dec. 29, 1939

Inventor:
Allan J. Wade,
by Harry E. Dunham
His Attorney.

Patented Mar. 17, 1942

2,276,810

UNITED STATES PATENT OFFICE 2,276,810

ELECTRIC VALVE CONTROL SYSTEM

Allan J. Wade, Schenectady, N. Y., assignor to General Electric Company, a corporation of New York Application December 29, 1939, Serial No. 311,553

9 Claims. (Cl. 175—363)

My invention relates to electric valve apparatus and more particularly to control systems for electric valves.

In applications employing electric valve translating apparatus of the controlled type having control members or grids, it has been found that the output voltage of the apparatus may be controlled very effectively by impressing on the grids variable unidirectional voltages. The variations in magnitude of the control voltage determine the conductivity of the electric valve means and hence control the amount of current transmitted thereby. In accordance with the teaching of my inventio . described hereinafter, I provide a new and improved control system for electric valve apparatus which permits control of an output characteristic of an electric valve means and which employs a minimum of associated control equipment.

It is an object of my invention to provide a new and improved control system for electric valve translating apparatus.

It is another object of my invention to provide a new and improved voltage regulating system for electric valve apparatus.

It is a further object of my invention to provide a new and improved control circuit for electric valve apparatus whereby a variable unidirectional biasing potential is impressed on the grids by means of a variable resistance connected between the cathode and the control members of the electric valves through an associated inductive network to control the current conducted by the electric valve means.

It is a still further object of my invention to provide a grid control system for electric valve apparatus which eliminates the heretofore necessary source of grid biasing potential.

Briefly stated, in the illustrated embodiment of my invention I provide an improved control system for electric valve apparatus of the controlled type in which a variable resistance produces a variable unidirectional biasing potential. The excitation circuit constituting a part of the control system comprises an inductive network which impresses on the control members alternating voltages of predetermined phase relation with respect to the associated anode-cathode voltages. Suitable means is provided for varying the magnitude of the resistance in response to a predetermined controlling influence, and other means is also provided for controlling the phase displacement of the alternating voltages.

Figure 1:
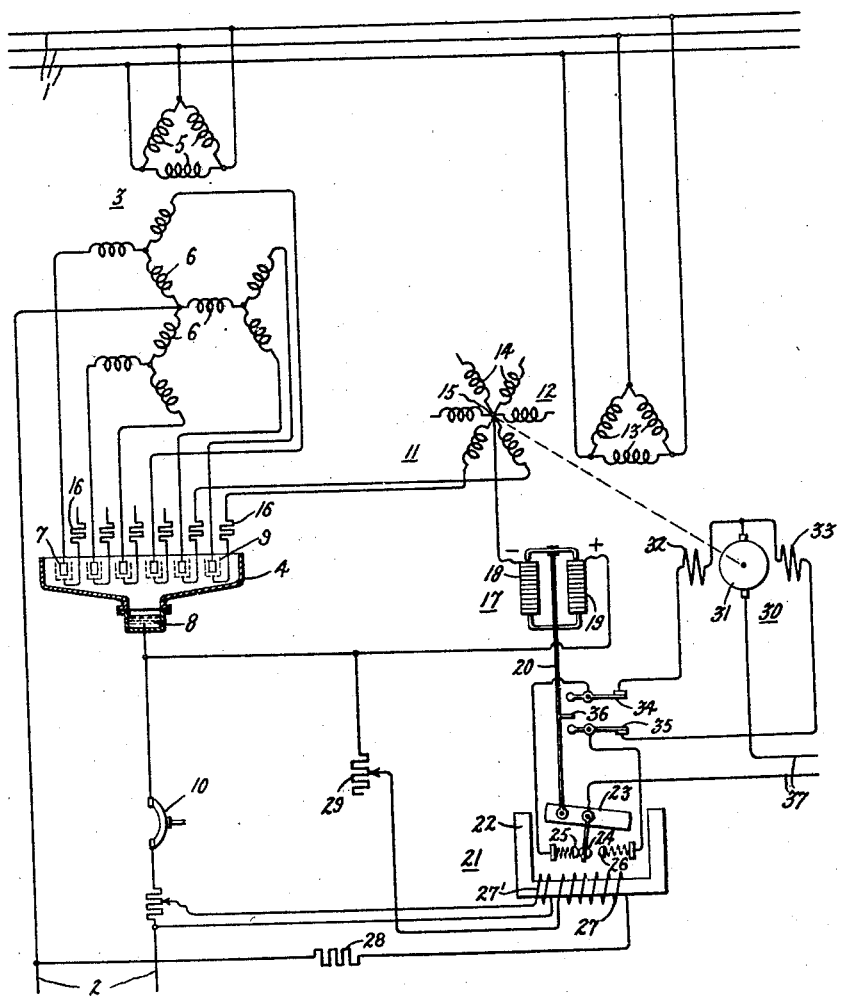
Figure 2:
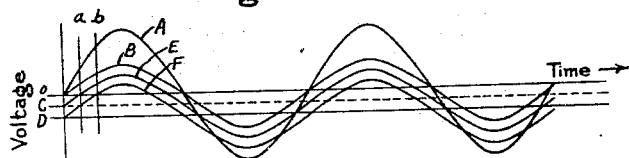
Figure 3:
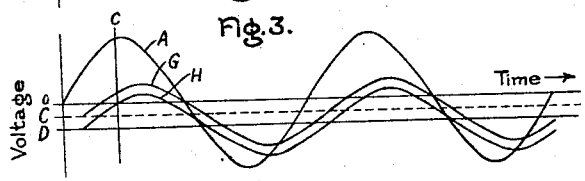

For a better understanding of my invention, reference may be had to the following description taken in connection with the accompanying drawing, and its scope will be pointed out in the appended claims. Fig. 1 illustrates an embodiment of my invention as applied to a polyphase electric valve rectifying system, and Figs. 2 and 3 represent certain operating characteristics thereof.

Referring now to Fig. 1 of the drawing, my invention is there illustrated as applied to an electric valve system for transmitting power from an alternating current supply circuit 1 to a direct current load circuit 2 through electric translating apparatus comprising a transformer 3 and an electric valve means 4. The transformer 3 may comprise a plurality of primary windings 5 and a plurality of secondary windings 6 arranged so that the anodes of the electric valve means, described hereinafter, conduct current in a predetermined order and for 60 electrical degree intervals.

The electric valve means 4 is preferably of the type employing an ionizable medium, such as a gas or a vapor, and may be of the type having a plurality of anodes 7 and a cathode 8 in a single enclosing receptacle. Of course, it will be well understood by those skilled in the art that instead of employing this form of electric valve means, I may employ a plurality of electric valve means each having a single anode and a single cathode in one enclosing receptacle. Hereinafter where the term "electrically common cathode" is employed, it is understood to apply to that type of electric valve means shown in the drawing and also to apply that arrangement in which a plurality of single-anode electric valves are connected together in conventional circuits. The electric valve means 4 comprises a plurality of control members or grids 9, each associated with a different one of the anodes 7, and control the conductivities of the associated arc discharge paths between the anodes and the cathode 8. A suitable circuit interrupter 10 may be connected in the direct current circuit, if desired.

I provide a new and improved excitation circuit or control circuit 11 for impressing on the grids 9 a variable unidirectional biasing potential to control the conductivities of the arc discharge paths of the electric valve means 4. The control circuit 11 comprises means, such as an inductive network 12, for producing a system of alternating voltages. The inductive network 12 may be constituted by a suitable phase shifting device energized from the alternating current circuit 1 and including a plurality of pri-

the alternating voltages impressed upon the grids 9 to a region which permits the control to be accomplished by the resistance 17 and the relay 21.

For the position of the armature 23 and the actuating arm 20 shown in Fig. 1, the value of the negative unidirectional biasing potential is maximum, and because the movable contact 24 engages contact 25, field winding 23 of motor 30 is energized to retard the phase of the alternating voltages impressed on the grids by rotation of the phase shifter 12. In this manner, the conductivity of the electric valve means 4 will be decreased by retardation in the phase of the alternating voltages until a region is reached in which the regulation may be effected solely by variation in the magnitude of the unidirectional biasing potential.

The operation of the embodiment of my invention shown in Fig. 1 may be more fully explained by referring to the operating characteristics shown in Figs. 2 and 3. Curve A represents the voltage impressed on one of the anodes 7, and curve B represents the grid voltage provided by the associated winding of the phase shifter 12. Lines C and D represent two values of the negative unidirectional biasing potential produced by resistance 17; and curves E and F represent the resultant voltage impressed on the grid. It will be understood by inspection of Fig. 2 that as the value of the resistance 17 is varied, the negative unidirectional biasing potential also varies and the time at which the associated arc discharge path is rendered conductive will vary depending upon the magnitude of the biasing potential. For example, if the biasing potential has a value corresponding to that of curve C, the associated arc discharge path will be rendered conductive at time a, and if the magnitude of the biasing potential increases to that corresponding to D, the arc discharge path will be rendered conductive at time b. Of course, it will be understood that the relay 21 is energized in response to the output voltage and in this manner the time at which the various arc discharge paths are rendered conductive may be controlled, and hence the output voltage may be maintained constant under variable load conditions.

If it be assumed that the load in the system decreases substantially, necessitating a substantial retardation in the phase of the resultant grid voltages in order to maintain the output voltage constant, the armature 23 of the relay 21 is, of course, moved to the position shown in Fig. 1 effecting energization of the proper field winding of motor 30 and retarding the resultant grid voltages to the position shown by curve G of Fig. 3. From that point the regulation may be effected solely by the variation in the unidirectional biasing potential. For example, the time of initiation of arc discharge may be varied from b to c by variation in the magnitude of the biasing potential. Curve H represents the phase of the resultant grid voltage after the adjustment of the rotary phase shifter 12 and for a substantially negative biasing potential. It will be understood that upon sudden application of a large increment of load, the armature 23 will be moved so that contact 24 engages contact 26, thereby effecting an advancement in the phase of the alternating component of voltages to a region within which the regulation may be effected solely by the resistance 17.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an alternating current circuit, a second circuit, electric translating apparatus connected between said circuits and including electric valve means comprising a plurality of anodes, an electrically common cathode and a plurality of control members each associated with a different one of said anodes, means for impressing on said control members alternating voltages including an inductive network having a plurality of windings and a neutral connection, a variable resistance connected between said cathode and said neutral connection and energized exclusively by the entire current transmitted between said cathode and said control members for producing a unidirectional biasing potential, and means for varying the magnitude of said resistance to vary said unidirectional biasing potential to control the conductivity of said electric valve means.

2. In combination, an alternating current circuit, a second circuit, electric translating apparatus connected between said circuits and including electric valve means comprising a plurality of anodes, an electrically common cathode and a plurality of control members each associated with a different one of said anodes, and a high impedance excitation circuit including means for impressing on said control members alternating voltages including a plurality of windings having an electrically neutral connection, a plurality of resistances each connected in series relation with a different one of said control members and a variable resistance connected between said cathode and said neutral connection and energized exclusively by the entire current transmitted between said cathode and said control members for impressing on said control members a unidirectional biasing potential.

3. In combination, an alternating current circuit, a second circuit, electric translating apparatus connected between said circuits and including electric valve means comprising a plurality of anodes, an electrically common cathode and a plurality of control members each associated with a different one of said anodes, means for impressing on said control members alternating voltages including an inductive network having a plurality of windings and an electrically neutral connection, a variable resistance connected between said cathode and said neutral connection and energized solely by the current transmitted between said cathode and said econtrol members for producing a unidirectional biasing potential, and means for controlling the value of said resistance in accordance with a predetermined controlling influence derived from one of said first mentioned circuits.

4. In combination, an alternaing current circuit, a second circuit, electric translating apparatus connected between said circuits and including electric valve means comprising a plurality of anodes, an electrically common cathode and a plurality of control members each associated with a different one of said anodes, a relatively high impedance excitation circuit including a plurality of windings for producing alternating voltages and having a neutral connection, a plurality of resistances each connected in series relation with a different one of said windings and a different one of said control members and a variable resistance energized exclusively by the current transmitted between said cathode and said control members connected between said neutral connection and said cathode for impressing on said control members a unidirectional biasing potential, and means for controlling said resistance in response to a predetermined electrical condition of one of said first mentioned circuits.

5. In combination, an alternating current circuit, a second circuit, electric translating apparatus connected between said circuits and including electric valve means comprising a plurality of anodes, an electrically common cathode and a plurality of control members each associated with a different one of said anodes, means for impressing on said control members alternating voltages including an inductive network having a plurality of windings and an electrically neutral connection, a variable resistance connected between said cathode and said neutral connection and energized by the current transmitted between said cathode and said control members for producing a negative unidirectional biasing potential, actuating means for adjusting the phase of said alternating voltages produced by said inductive network, and control means for said resistance for varying said negative unidirectional biasing potential and including means for energizing said actuating means to adjust the phase displacement between said alternating voltages and the voltage of said alternating current circuit.

6. In combination, an alternating current supply circuit, a second circuit, electric translating apparatus connected between said circuits and including electric valve means comprising a plurality of anodes, an electrically common cathode and a plurality of control members each associated with a different one of said anodes, means for impressing on said control members alternating voltages including an inductive network having a plurality of windings and a neutral connection, a variable resistance connected between said cathode and said neutral connection and energized by the current transmitted between said cathode and said control members to produce a unidirectional biasing potential, actuating means for obtaining adjustment of the conductivity of said electric valve means by controlling the phase of said alternating voltages, and control means for said resistance to vary said unidirectional biasing potential and including follow-up means for energizing said actuating means to adjust the phase displacement between said alternating voltages and the voltage of said supply circuit and thereby to limit the variation in the magnitude of said unidirectional biasing potential.

7. In combination, an alternating current supply circuit, a second circuit, electric translating apparatus connected between said circuits and including electric valve means comprising a plurality of anodes, an electrically common cathode and a plurality of control members each associated with a different one of said anodes, means for impressing on said control members alternating voltages including an inductive network having a plurality of windings and a neutral connection, a rheostatic regulator connected between said cathode and said neutral connection and including a resistance energized by the current transmitted between said cathode and said control members to produce a unidirectional control biasing potential, motor means for operating said inductive network to adjust the phase of said alternating voltages, and control means for said regulator to vary the magnitude of said unidirectional biasing potential to effect small changes in the conductivity of said electric valve means and including follow-up means for energizing said motor means to effect relatively large changes in the conductivity of said electric valve means.

8. In combination, an alternating current supply circuit, a second circuit, electric translating apparatus connected between said circuits and including electric valve means comprising a plurality of anodes, an electrically common cathode and a plurality of control members each associated with a different one of said anodes, means for impressing on said control members alternating voltages including an inductive network having a plurality of windings and a neutral connection, a rheostatic regulator connected between said cathode and said neutral connection and including a resistance energized by the current transmitted between said cathode and said control members to produce a unidirectional control biasing potential, motor means for operating said inductive network to adjust the phase of said alternating voltages, and control means for operating said regulator comprising an electromagnetic relay having an armature member, a movable contact and a pair of follow-up contacts adapted to be engaged by said movable contact to effect control of said motor means.

9. In combination, an alternating current circuit, a second circuit, electric translating apparatus connected between said circuits and comprising electric valve means having a plurality of anodes and an electrically common cathode and a plurality of control members each associated with a different one of said anodes, an inductive network including a plurality of windings for impressing on said control members alternating voltages of variable phase displacement with respect to the voltage of said alternating current circuit, a rheostatic regulator having a resistance connected in circuit with said control members and said windings for producing a variable unidirectional biasing potential and comprising an actuating arm for controlling the value of said resistance, motor means for positioning said windings, electromagnetic means for operating said arm including a core member, an armature, a movable contact operated by said armature and a pair of follow-up contacts adapted to be engaged by said movable contact when said armature is in extreme positions to effect energization of said motor means, and means actuated by said electromagnetic means for effecting deenergization of said motor means when the conductivity of said electric valve means tends to exceed a predetermined range of values.

ALLAN J. WADE.